(12) United States Patent
Dearing et al.

(10) Patent No.: US 7,627,578 B2
(45) Date of Patent: Dec. 1, 2009

(54) APPARATUS, SYSTEM, AND METHOD FOR FILE SYSTEM SERIALIZATION REINITIALIZATION

(75) Inventors: Gerard Maclean Dearing, San Jose, CA (US); William Stuart Edwards, San Jose, CA (US); Elmer Enrique Latorre, San Jose, CA (US); Thomas Alexander Mahon, San Jose, CA (US); Lyle LeRoy Merithew, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 10/932,200

(22) Filed: Sep. 1, 2004

(65) Prior Publication Data

US 2006/0047685 A1 Mar. 2, 2006

(51) Int. Cl.
*G06F 17/30* (2006.01)

(52) U.S. Cl. .......... 707/10; 707/202; 707/204; 707/3; 707/5; 707/100; 707/102; 707/200; 707/203; 711/162; 709/203; 714/5; 713/155; 713/165

(58) Field of Classification Search .......... 707/3–5, 707/10, 100, 102, 202, 204, 200, 203; 711/162; 709/203; 713/155, 165; 714/5
See application file for complete search history.

(56) References Cited

U.S. PATENT DOCUMENTS

| | | | | |
|---|---|---|---|---|
| 5,095,421 A | * | 3/1992 | Freund | 718/101 |
| 5,185,871 A | | 2/1993 | Dawkins et al. | 710/200 |
| 5,490,270 A | * | 2/1996 | Devarakonda et al. | 707/201 |
| 5,504,900 A | * | 4/1996 | Raz | 707/10 |
| 5,664,088 A | * | 9/1997 | Romanovsky et al. | 714/13 |
| 5,752,060 A | * | 5/1998 | Yoshida | 707/10 |
| 5,845,117 A | * | 12/1998 | Fujita | 718/107 |
| 5,950,218 A | | 9/1999 | Howard | 711/4 |

(Continued)

OTHER PUBLICATIONS

Minwen Ji, "Atomicity, serialization and recovery in the island-based file sytem", INSPEC—6806009; Proceedings IEEE International Conference on Cluster Computing. Cluster 2000, pp. 369-370, Published: Los Alamitos, CA, USA, 2000.xxvii + 406 pp.

(Continued)

*Primary Examiner*—Isaac M Woo
*Assistant Examiner*—Syling Yen
(74) *Attorney, Agent, or Firm*—Kunzler & McKenzie

(57) ABSTRACT

An apparatus, system, and method are disclosed for reinitializing serialization data in a file server. The apparatus includes a failure recognition module, a discard module, and a serialization module. The failure recognition module recognizes a file system serialization failure on a file server. Upon recognition of the serialization failure, the discard module discards existing serialization data located in a first memory address space, such as a file server address space. In certain embodiments, the entire file server address space may be destroyed by the operating system. The serialization module then generates new serialization data from existing connection/position data. The connection/position data is located in a second address space, such as a client address space, that is maintained during the serialization reinitialization process. Containing and rebuilding the serialization data in this manner beneficially prevents system outages, reduces downtime, and decreases the likelihood of subsequent serialization deadlocks.

41 Claims, 7 Drawing Sheets

U.S. PATENT DOCUMENTS

| | | | | |
|---|---|---|---|---|
| 5,960,436 | A | 9/1999 | Chang et al. | 707/101 |
| 6,115,710 | A * | 9/2000 | White | 707/10 |
| 6,192,389 | B1 * | 2/2001 | Ault et al. | 718/101 |
| 6,351,744 | B1 | 2/2002 | Landresse | 707/8 |
| 6,442,551 | B1 * | 8/2002 | Ofek | 707/10 |
| 6,658,415 | B1 | 12/2003 | Brown et al. | 707/10 |
| 6,665,814 | B2 | 12/2003 | Hobson et al. | 714/16 |
| 6,732,124 | B1 | 5/2004 | Koseki et al. | 707/202 |
| 6,751,617 | B1 * | 6/2004 | Anfindsen | 707/8 |
| 6,886,064 | B2 | 4/2005 | Dawkins et al. | 710/200 |
| 6,920,467 | B1 * | 7/2005 | Yoshimoto | 707/202 |
| 6,928,488 | B1 | 8/2005 | de Jong et al. | 709/246 |
| 6,957,221 | B1 | 10/2005 | Hart et al. | 707/100 |
| 7,010,657 | B2 | 3/2006 | Lowe et al. | 711/165 |
| 7,039,915 | B2 | 5/2006 | Kavoori et al. | |
| 2002/0023139 | A1 * | 2/2002 | Hultgren | 709/216 |
| 2002/0032873 | A1 | 3/2002 | Lordemann et al. | 713/201 |
| 2002/0066051 | A1 | 5/2002 | Hobson et al. | 714/16 |
| 2002/0078028 | A1 | 6/2002 | Lisanke | 707/1 |
| 2003/0120680 | A1 | 6/2003 | Agrawal et al. | 707/103 R |
| 2003/0158862 | A1 * | 8/2003 | Eshel et al. | 707/200 |
| 2003/0217310 | A1 | 11/2003 | Ebsen et al. | 714/42 |
| 2003/0220967 | A1 * | 11/2003 | Potter et al. | 709/203 |
| 2004/0015834 | A1 | 1/2004 | Mestre et al. | 717/106 |
| 2004/0025169 | A1 * | 2/2004 | Wiser et al. | 719/315 |
| 2004/0064439 | A1 * | 4/2004 | Hinshaw et al. | 707/1 |
| 2004/0133501 | A1 | 7/2004 | Parry et al. | 707/102 |
| 2004/0172390 | A1 | 9/2004 | Srivastava et al. | 707/3 |
| 2005/0010615 | A1 | 1/2005 | Cypher et al. | 707/201 |
| 2005/0071384 | A1 | 3/2005 | Cotner et al. | 707/200 |
| 2005/0091231 | A1 | 4/2005 | Pal et al. | 707/100 |
| 2005/0289558 | A1 * | 12/2005 | Illowsky et al. | 719/318 |
| 2006/0129600 | A1 * | 6/2006 | Ode | 707/104.1 |

OTHER PUBLICATIONS

Sandoz A, "Achieving high availability in a replicated file system by dynamically ordering transactions", INSPEC—3908329; Proceedings. The 10$^{th}$ International Conference on Distributed Computing Systems (Cat. No. 90CH2878-7), pp. 432-439, Published: Los Alamitos, CA, USA, 1990, xxi + 600 pp.

Gronvall G; Westerlund A; Pink S, "The design of a mulicast-based distributed file system", INSPEC—6231025; Operating Systems Review, spec. issue., pp. 251-264, Winter 1998.

Shian Hua Lin; Yueh Min Huang; Chi Nan Chen, "The design of a distributed file server based on distributed shared memory," INSPECT—5005038;1994 International Computer Symposium Conference Proceedings, Pt. vol. 2, pp. 1190-1196 vol. 2, Published: Hsinchu, Taiwan, 1994, 2 vol. Xvi+1310 pp.

* cited by examiner

300

| Application Identifier 302 | Directory Identifier 304 | File Identifier 306 | Position Identifier 308 |
|---|---|---|---|

| Task Identifier 322 | Resource Identifier 324 | Exclusivity Identifier 326 |
|---|---|---|

FIG. 3b

APPARATUS, SYSTEM, AND METHOD FOR FILE SYSTEM SERIALIZATION REINITIALIZATION

BACKGROUND OF THE INVENTION

1. Field of the Invention

This invention relates to file servers and more particularly relates to reinitializing serialization data in a file server in response to a serialization failure.

2. Description of the Related Art

Serialization of a plurality of data access requests can be extremely complicated for data storage devices that are shared among multiple-processor file system servers. Serialization of the data access requests involves defining which applications are connected to which storage devices, or portions thereof, and what kind of access is provided for each application. For example, some applications are given exclusive access rights for certain write operations, while others may not receive exclusive access. Also, some applications may receive shared access rights for certain read operations on the shared data storage devices. By defining which applications are allowed which type of access at which times, the file system servers are able to prevent many data operation errors that would otherwise occur.

However, serialization techniques are not perfect and a serialization implementation may fail. A serialization failure may occur when read or write access to a requested data file or directory is not made available to a requesting application. For example, a serialization failure may occur when two applications are requesting data access rights to data that is exclusively assigned to the other application.

FIG. 1a shows one example of an application environment 10 in which a serialization conflict might occur. In particular, the illustrated application environment 10 includes a first application 12 and a second application 14. The first application 12 has exclusive rights (as shown by the solid arrow 16) to a first data file 18. Likewise, the second application 14 has exclusive rights (as shown by the solid arrow 20) to a second data file 22.

FIG. 1a also shows the first application 12 requesting access rights (as shown by the dashed arrow 24) to the second data file 22. Likewise the second application 14 may request access rights (as shown by the dashed arrow 26) to the first data file 22. In this case, a serialization "deadlock" failure occurs when neither the first application 12 nor the second application 14 can progress until the requested access rights are granted, but the requested access rights cannot be granted because the requested data files 18, 22 are already in use by the non-requesting applications 12, 14. When this type of serialization failure occurs, the file system server (not shown) may become nonresponsive and thereby unavailable because the applications 12, 14 continue to hold onto their existing access rights while requesting the additional access rights.

Although an internal serialization failure, by itself, does not compromise either the integrity of the data stored in the data files 18, 22 or the run-time states of the in-flight applications 12, 14, such a serialization failure can have drastic effects on the file system server. For instance, a serious serialization failure may occur where the file system is central to an operating system, such as when the ability to load programs from a file system is necessary for basic operating system functions. Furthermore, serialization failures can result in operating system outages, which can cause the failure of all in-flight application processing, including processing that is not directly related to the corresponding file system. Additionally, serialization failures may lead to excessive costs due to file system server downtime that impacts business-critical applications.

With regard to file system serialization failures, the conventional focus is on correcting the underlying causes of all serialization problems. However, this solution is practically infeasible given the complexity of contemporary multitasking, multiprocessing, and clustering environments in which the number of possible serialization problems and causes is overwhelming.

From the foregoing discussion, it should be apparent that a need exists for an apparatus, system, and method automatically handling file system serialization failures in a manner to overcome the disadvantages of conventional technology. Beneficially, such an apparatus, system, and method would allow in-flight applications to remain logically connected to the file system while the file system serialization information is reinitialized. Additionally, such an apparatus, system, and method would be advantageous over conventional systems and methods by preventing system outages and related costs.

SUMMARY OF THE INVENTION

The present invention has been developed in response to the present state of the art, and in particular, in response to the problems and needs in the art that have not yet been fully solved by currently available file system serialization systems. Accordingly, the present invention has been developed to provide an apparatus, system, and method for reinitializing a file server that overcome many or all of the above-discussed shortcomings in the art.

The apparatus to reinitialize a file server is provided with a logic unit containing a plurality of modules configured to functionally execute the necessary steps of reinitializing the serialization data of a file system server. These modules in the described embodiments include a front end module and a back end module. In one embodiment, the front end module resides in a client address space and the back end module resides in a file server address space.

In certain embodiments, the front end module may include a connection module and a suspension apparatus. The connection module manages the connection/position information (also referred to as connection/position data) that describes open file connections or other resource connections associated with an application. The suspension apparatus, in one embodiment, suspends data access requests prior to and during reinitialization of the file server serialization.

The back end module, in certain embodiments, may include a serialization module, a quiesce module, a discard module, and a failure recognition module. The serialization module manages the serialization data for a given application corresponding to a client address space. The serialization module also generates new serialization data from existing connection/position data as a part of the reinitialization operation.

The failure recognition module recognizes a serialization failure. The discard module discards the existing serialization data. For instance, the discard module may request that the operating system destroy the address space in which the existing serialization data is located. In one embodiment, the existing serialization data is located in a file server address space. In a further embodiment, the entire back end module also may be located in the file server address space that is destroyed by the operating system. The suspension module may facilitate the creation of a new file server address space after the existing file server address space is discarded. The quiesce module quiesces the file server prior to and during the reinitialization process. In one embodiment, the quiesce period is coordinated with the suspension apparatus described above.

The back end module also may include a completion apparatus and a cluster apparatus. The completion apparatus tracks the progress of a task associated with an application. In one embodiment, the completion apparatus may be used in conjunction with the quiesce module to stabilize the connection/position data during the quiesce period. The connection/position data may reside in the client address space, which is preserved and not discarded during the file system serialization reinitialization. The cluster apparatus manages the necessary rights and negotiation communications among a plurality of file servers within a cluster when the serialization data on one file server is reinitialized.

A system of the present invention is also presented to reinitialize the serialization data of a file system server. The system may be embodied in a processing cluster including a plurality of file servers having shared access to one or more shared data storage devices. In particular, one embodiment of the system includes a plurality of file servers, a shared storage device, and a serialization reinitialization apparatus. The system also may include a coupling facility to facilitate global serialization among the plurality of file servers.

The system may further include a notification module. In one embodiment, the notification module is configured to notify one or more remote file servers within the processing cluster when a local file server is expected to be reinitialized. Similarly, the notification module notifies the remote file servers after the local file server is reinitialized.

A method of the present invention is also presented for reinitializing a file server. The method in the disclosed embodiments substantially includes the steps necessary to carry out the functions presented above with respect to the operation of the described apparatus and system. In one embodiment, the method includes recognizing a file system serialization failure on a file server, discarding the existing serialization data, and generating new serialization data from the existing connection/position data. As mentioned above, the existing connection/position data is stabilized and maintained, for example, in the client address space throughout the reinitialization process.

The method also may include quiescing the file server, invoking an operating system function to destroy the file server address space, and invoking an operating system function to create a new file server address space. Additionally, the method may include searching the memory for the existing connection/position data, generating the new serialization data from the existing connection/position data located in the client address spaces, and storing the new serialization data in the new file server address space.

A signal bearing medium is also presented. The signal bearing medium is configured to store software instructions to carry out some or all of the functions described above with reference to the method, apparatus, and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3a is a schematic block diagram illustrating one embodiment of connection/position data in accordance with the present invention;

FIG. 3b is a schematic block diagram illustrating one embodiment of serialization data in accordance with the present invention;

DETAILED DESCRIPTION OF THE INVENTION

Figure 1A:
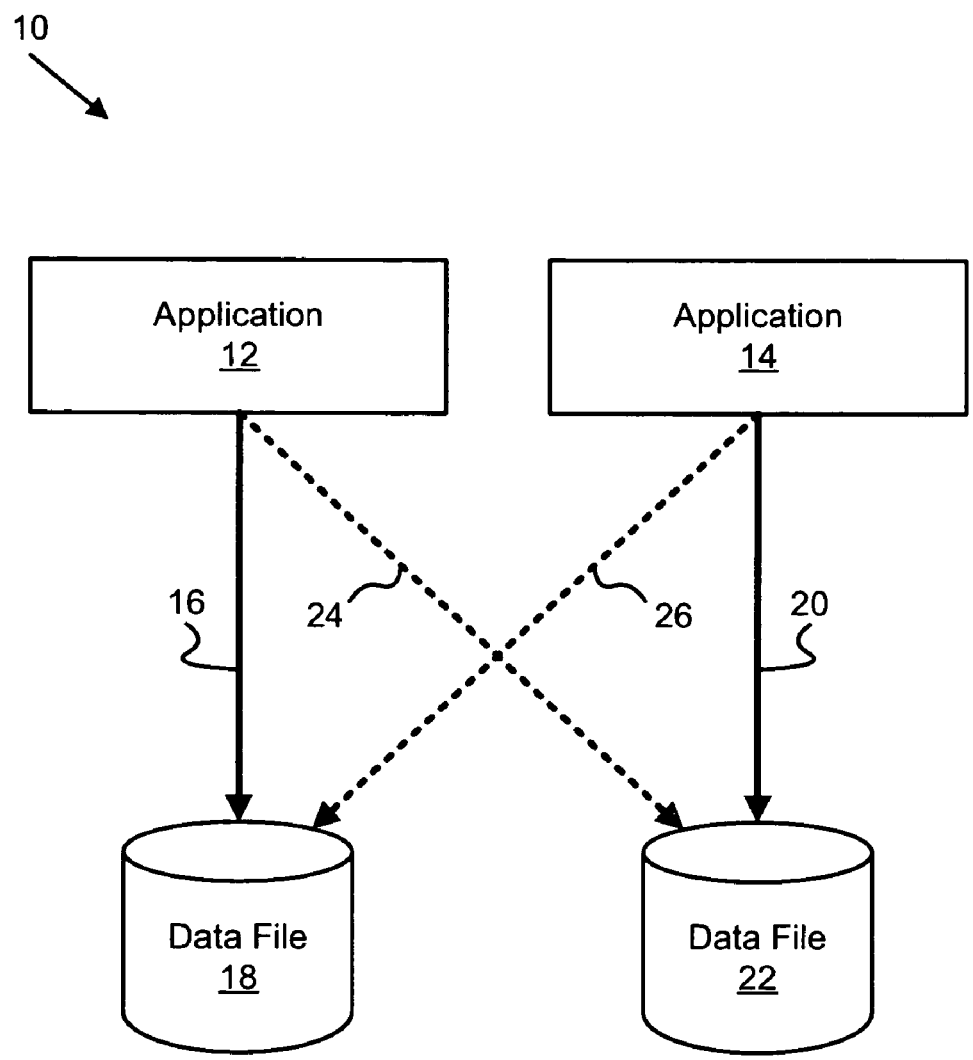
FIG. 1a is a schematic block diagram illustrating one embodiment of an application environment in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1B:
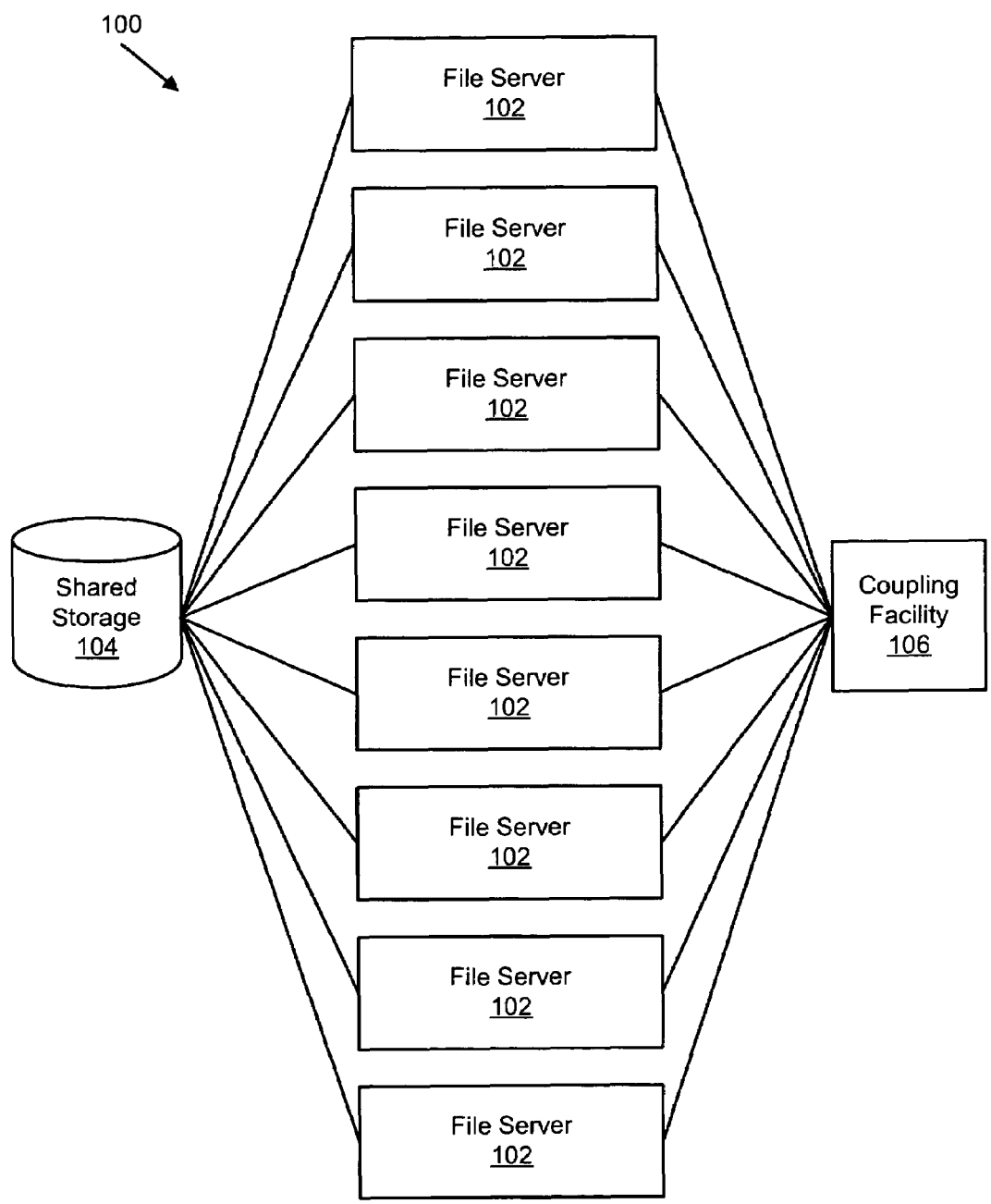
FIG. 1b is a schematic block diagram illustrating one embodiment of a storage system cluster in accordance with the present invention.

FIG. 1b depicts one embodiment of a processing cluster 100 in which certain embodiments of the present invention may be employed. The illustrated processing cluster 100 includes a plurality of file servers 102, one or more shared storage devices 104, and a coupling facility 106. Each file server 102 is configured to manage resources on the processing cluster 100. For example, the plurality of file servers 102 manages allocation of processing, memory, and data storage resources for each application or other software program executing on the processing cluster 100. As used herein, references to an "application" may include application software as well as system software, such as an operating system, unless indicated otherwise.

The shared storage devices 104 comprise electronic storage devices that are configured to store data per instructions from the plurality of file servers 102. In one embodiment, the shared storage devices 104 comprise a plurality of hard disk drives. Alternately, the shared storage devices 104 may comprise one or more optical drives, tape drives, and/or other data storage drives. Data stored on the shared storage devices 104 may be read and otherwise accessed by the file servers 102. In one embodiment, the data on the shared storage devices 104 may be stored within a file system including directories, sub-directories, files, and other directory entries. Each of the directories, sub-directories, files, other directory entries, and similar data structures is a shared storage resource within the processing cluster 100.

Each time an application on one of the file servers 102 requests access to data on one of the shared storage devices 104, the file server 102 coordinates the data access with other client applications running on the same file server 102 and on the other file servers 102 in the processing cluster 100. This coordination is referred to as serialization because the file server 102 allows serial, or consecutive, access to the data on the shared storage 104. Serialization allows each application to have either shared or exclusive access to a particular set of data so that other applications do not interfere with or otherwise disrupt the target set of data.

Serialization may be implemented on various levels of granularity within the processing cluster 100 and shared storage devices 104. For example, serialization may occur at a directory level or a sub-directory level. Additionally, serialization may occur at a file, record, or packet level. The serialization granularity depends on the type of processing cluster 100, file servers 102, shared data storage devices 104, and other hardware used within the processing cluster 100. The granularity also may depend on the type of data access operations that are requested by an application or an operating system.

The coupling facility 106, in one embodiment, is provided to facilitate serialization among all of the file servers 102 within the processing cluster 100. In particular, the coupling facility 106 may store serialization information and assist in messaging operations among the many file servers 102. Alternate embodiments of the processing cluster 100, however, may perform global serialization without the assistance of a coupling facility 106.

Figure 2:
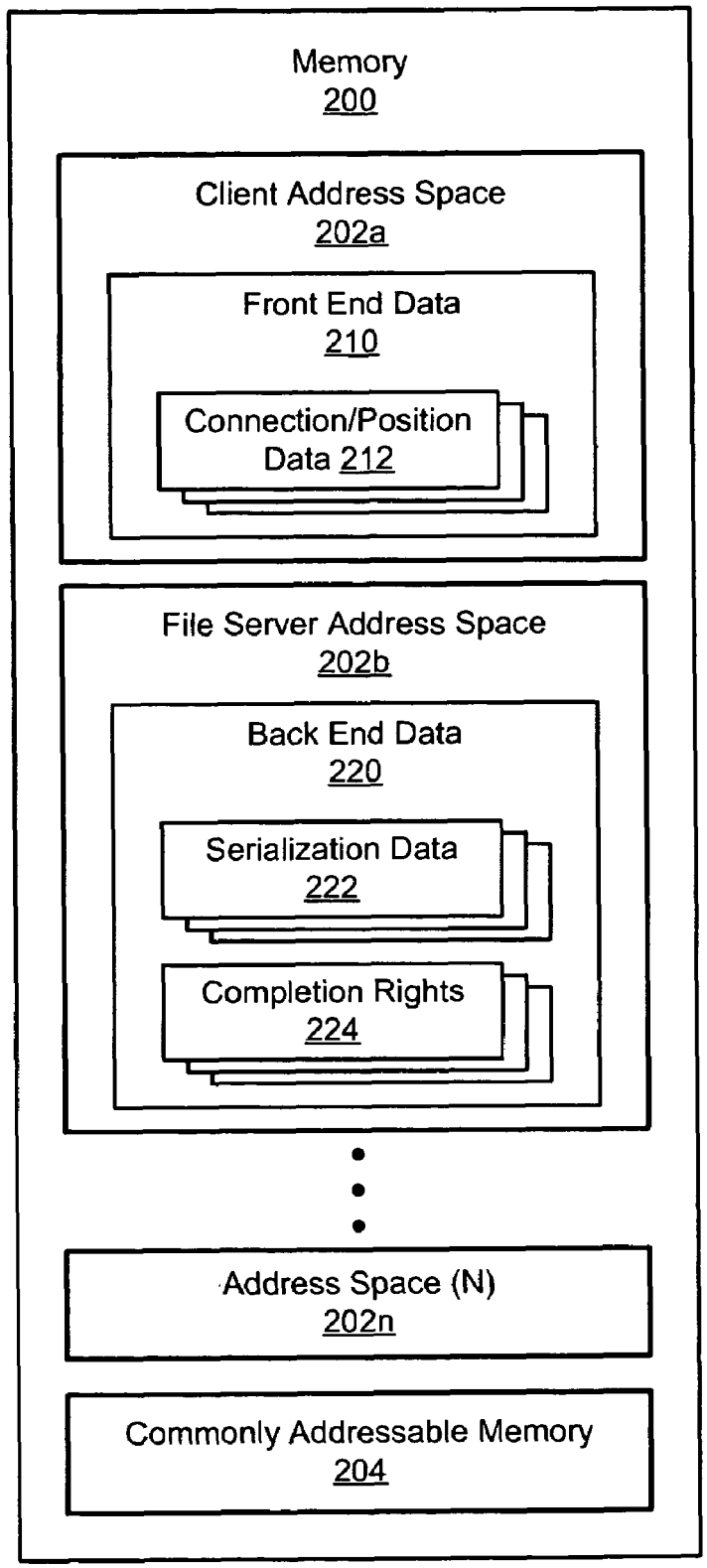
FIG. 2 is a schematic block diagram illustrating one embodiment of an electronic memory device in accordance with the present invention.

FIG. 2 depicts one embodiment of an electronic memory device 200 that may be used to store serialization programs and data, as well as related information. The illustrated memory 200 is divided into a plurality of address spaces 202. Each address space 202 comprises a set of legal memory addresses allocated for a given application and represents the amount of memory 200, either physical or virtual, that is allocated to the application. The illustrated memory 200 specifically includes a client address space 202a, a file server address space 202b, and additional address space(s) 202n. The memory 200 also includes commonly addressable memory 204.

A client address space 202a maybe created for each application that interfaces with a given file server 102. For instance, a memory 200 may include four client address spaces 202a, one for each of four clients interfacing with the file server 102. The client address space 202a also may be referred to as the "front end" because it is responsible for interacting directly with the application programs. In general, the client address space 202a facilitates data access operations for the requesting software program, such as application software or system software.

The illustrated client address space 202a includes front end data 210, generally, and specifically includes connection/position data 212. Each client address space 202a may contain corresponding front end data 210, including connection/position data 212, pertinent to the associated client. The connection/position data is descriptive of the data on the shared storage devices 104 that is accessed by the corresponding application. An example of connection/position data 212 is described in more detail with reference to FIG. 3a.

References throughout this description to "a" or "the" client address space 202a in singular form is understood to refer to one or more client address spaces 202a, where each client address space 202a corresponds to an independent client. Similarly, references to front end data 210 and/or connection/position data 212 is understood to refer to such data for one or more clients interfacing with a given file server 102.

The file server address space 202b, in one embodiment, is responsible for serialization within the file server 102 and for data access to the shared storage devices 104. The file server address space 202b also may be referred to as the "back end" because it manages the interface between the file server 102 and the shared storage devices 104. In particular, the file server address space 202b serializes the data access requests for the application corresponding to the associated client address space 202a. These data access requests are serialized with other data access requests from other applications serviced by the same file server 102 and other file servers 102 within the processing cluster 100.

The illustrated file server address space 202b includes back end data 220, generally, and specifically includes serialization data 222. In further embodiments, the back end data 220 also may include completion rights 224, which may indicate the processing status of a data access request and/or the stability of the connection/position data 212 stored in the client address space 202a.

The additional address space(s) 202n may be used for similar programs and data as those stored in the client address space 202a and the file server address space 202b. The additional address space(s) 202n also may include a master address space, and so forth, as is currently known in the art.

The commonly addressable memory 204 is a portion of the memory 200 that may be used to store programs and data that are commonly accessible by one or more address spaces 202. For instance, the commonly addressable memory 204 may be used to store data, such as file names, or metadata that is commonly referenced by both the connection/position data 212 in the client address space 202a and the serialization data 222 in the file server address space 202b.

FIG. 3a depicts one embodiment of connection/position data 300 that is substantially similar to the connection/position data 212 described with reference to FIG. 2. The connection/position data 300 includes several fields that are each configured to store an identifier or other data to describe the connection and position information that is associated with a data access request corresponding to a particular application. The connection/position data 300 also may be referred to herein as connection/position information or connection/position records.

The illustrated connection/position data 300 includes an application identifier field 302, a directory identifier field 304, a file identifier field 306, and a position identifier field 308. In a further embodiment, the connection/position data 300 may include fewer or more data and/or metadata fields. In one embodiment, the application identifier field 302 stores an application identifier that identifies the application for which the client address space 202a exists.

The directory identifier field 304 stores a directory identifier that identifies a directory on the shared storage devices 104 that is being used for operations associated with the application identified by the application identifier. Similarly, the file identifier field 306 stores a file identifier that identifies a file that is being used for data access operations associated with the same application. In certain embodiments, the file identifier may relate to the directory identifier in that the file is a member of the directory. Given this relationship, the file identifier also may be referred to as a member identifier. The directory identifier and the file identifier may generally be referred to as resource identifiers. In alternate embodiments of the invention, other resource identifier fields and resource identifiers maybe present within the connection/position data 300.

The position identifier field 308, in one embodiment, stores a position identifier that identifies the position at which the file or storage resource is currently or most recently accessed. In one embodiment, the position identifier may comprise a byte offset that indicates the current read or write position by a number of bytes from the beginning of the file that is being accessed.

FIG. 3b depicts one embodiment of serialization data 320 that is substantially similar to the serialization data 222 described above with reference to FIG. 2. The serialization data 320 includes several fields that are each configured to store an identifier or other data to describe the serialization information that is associated with a data access request corresponding to a particular task. A task is one data access operation that is associated with a particular application. An application may generate one or many tasks. The serialization data 320 also may be referred to herein as serialization information or serialization records.

The illustrated serialization data 320 includes a task identifier field 322, a resource identifier field 324, and an exclusivity identifier field 326. In a further embodiment, the serialization data 320 may include fewer or more data and/or metadata fields. In one embodiment, the task identifier field 322 stores a task identifier that identifies the task that is executed within the file server address space 202b.

In one embodiment, the resource identifier field 324 stores a resource identifier that identifies either an input resource or an output resource associated the task identified by the task identifier. In one embodiment, the resource identifier may identify an input resource, such as a shared storage device 104, from which data may be input into the task operation. For instance, the task operation may read data from a shared storage device 104. In a further embodiment, the resource identifier may identify an output resource, such as a buffer, to which data may be sent according to the task operation.

The exclusivity identifier field 326 stores an exclusivity identifier that identifies the type of resource exclusivity provided for the identified task to the identifier resource. For example, the task may have either shared or exclusive read access to a target data set to be read from the shared storage devices 104. In many instances, though not all, the exclusivity identifier provides shared access for data read (input) operations. In a further example, the task may have exclusive write access to a target buffer on which data may be written. In many instances, though not all, the exclusivity identifier provides exclusive access for data write (output) operations.

Figure 4:
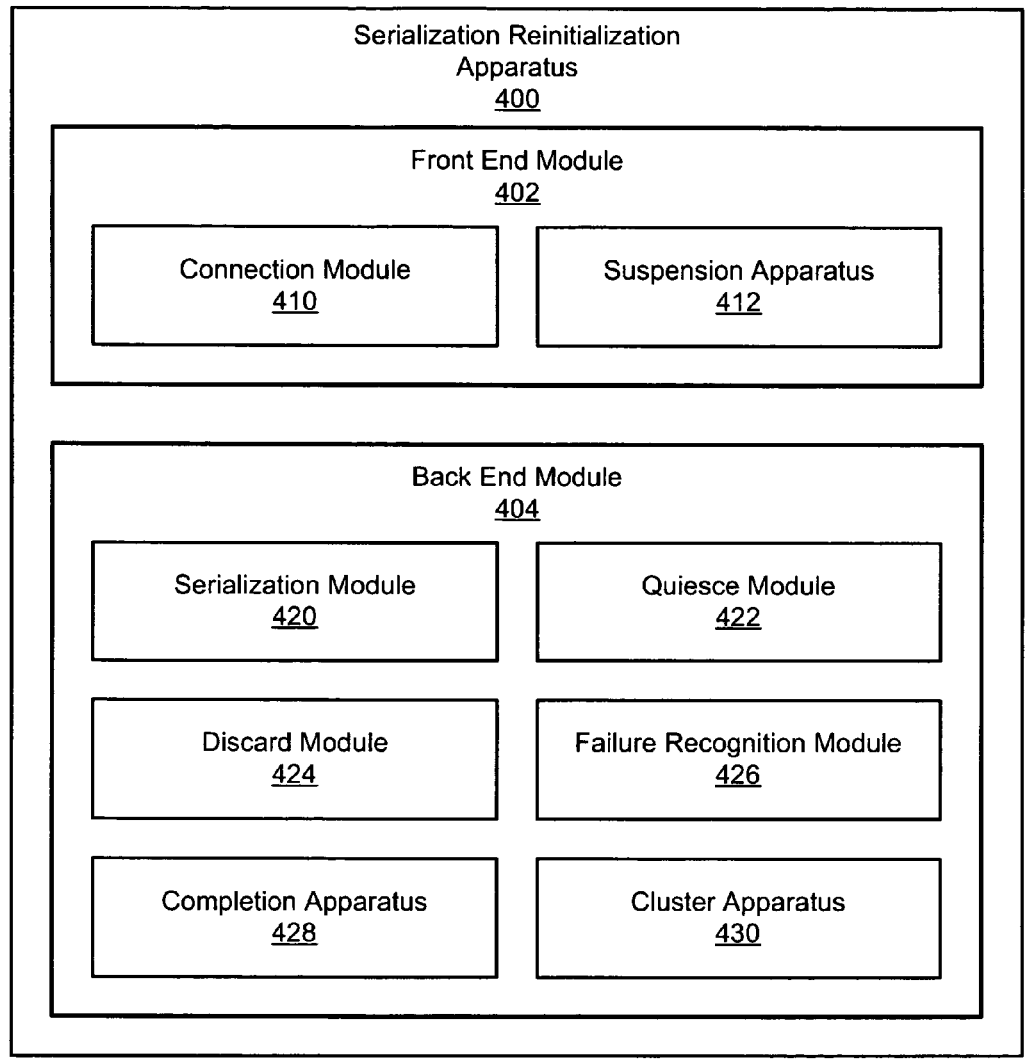
FIG. 4 is a schematic block diagram illustrating one embodiment of a Co serialization reinitialization apparatus in accordance with the present invention.

FIG. 4 depicts one embodiment of a serialization reinitialization apparatus 400 that may be used in conjunction with various embodiments of the present invention. The illustrated serialization reinitialization apparatus 400 includes a front end module 402 and a back end module 404. In one embodiment, the front end module 402 and the back end module 404 are software programs that reside in the client address space 202a and file server address space 202b, respectively.

The serialization reinitialization apparatus 400 is configured to reinitialize the serialization data 222 of the file server 102 in response to a serialization error or failure. As described above, a serialization failure may occur when one or more applications cannot properly access stored data that is necessary for completion of an operation. For example, referring back to FIG. 1, a file server 102 may be waiting for a first application 12 having exclusive access rights to a data file 18 to conclude an operation before allowing a second application 14 to have access rights to the same data file 18.

When serialization data 222 within a file server 102 or among a plurality of file servers 102 within a processing cluster 100 fails, the file server 102 or processing cluster 100 may become unavailable. For example, a file server 102 may become nonresponsive or "deadlocked" when two applications 12, 14 attempt to access data that is exclusively reserved for each other. By reinitializing the serialization data 222 of the file server 102, the serialization reinitialization apparatus 400 discards the existing serialization information 222 and reconstructs new serialization information from the connection/position data 212, thereby correcting any serialization failures.

Referring back to FIG. 4, the front end module 402, in one embodiment, includes a connection module 410 and a suspension apparatus 412. The connection module 410 is configured to monitor and record the connection/position data 212 for each task associated with an application. The suspension apparatus 412 is configured, in one embodiment, to suspend data access requests while the serialization data 222 for the file server 102 is being reinitialized. In one embodiment, the suspension apparatus 412 suspends the data access requests during a quiesce period prior to the serialization reinitialization, as well as during the serialization reinitialization.

The back end module 404, as illustrated, includes a serialization module 420, a quiesce module 422, a discard module 424, a failure recognition module 426, a completion apparatus 428, and a cluster apparatus 430. The serialization module 420, in one embodiment, is configured to manage the serialization data 222 for the file server 102. Additionally, the serialization module 420 may rebuild the serialization data 222 from the connection/position data 212 in conjunction with a serialization reinitialization of the file server 102.

The quiesce module 422 is configured, in one embodiment, to define and implement a quiesce period prior to a reinitialization of the serialization data 222 of the file server 102. In certain embodiments, the quiesce period may be a few seconds. Alternately, the quiesce period may be longer or shorter than a few seconds. During the quiesce period, the back end module 404 may deny new data access requests from the front end module 402. Additionally, the quiesce period may be used to allow ongoing tasks to complete prior to serialization reinitialization. Furthermore, ongoing tasks may be suspended or otherwise postponed during the quiesce period in order to maintain the integrity of the connection/position data 212 stored in the client address space 202a.

The discard module 424, in one embodiment, is configured to discard the existing serialization data 222 in conjunction with a serialization reinitialization of the file server 102. In certain embodiments, for example, the discard module 424 may request that the operating system simply destroy all of the information, programs, and data stored in the file server address space 202b, or back end. In other words, the operating system may be invoked to delete the back end data 220, including the existing serialization data 222 and the completion rights 224. Furthermore, the operating system may entirely discard the back end module 404, including the serialization module 420, the quiesce module 422, the discard module 424, the failure recognition module 426, the completion apparatus 428, and the cluster apparatus 430. Each of these back end modules, apparatuses, and data may be rebuilt during the serialization reinitialization.

The failure recognition module 426 is configured, in one embodiment, to recognize a serialization failure within the file server 102. In a further embodiment, the failure recognition module 426 may recognize a global serialization failure, for example in conjunction with the coupling facility 106. In an alternate embodiment, a human operator may recognize a situation in which the file server 102 is nonresponsive and explicitly issue a command on a system console keyboard (not shown) to initiate the reinitialization process. In this case, the operator may use diagnostic aids to help make such a determination.

The completion apparatus 428 is configured, in one embodiment, to track the completion progress of a task. In one embodiment, the completion apparatus 428 may create and use the completions rights 224 within the back end data 220 to track the progress of a task. The cluster apparatus 430, in one embodiment, is configured to manage communication and operations of the processing cluster 100 during serialization reinitialization of one of the plurality of file servers 102.

The following schematic flow chart diagrams are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
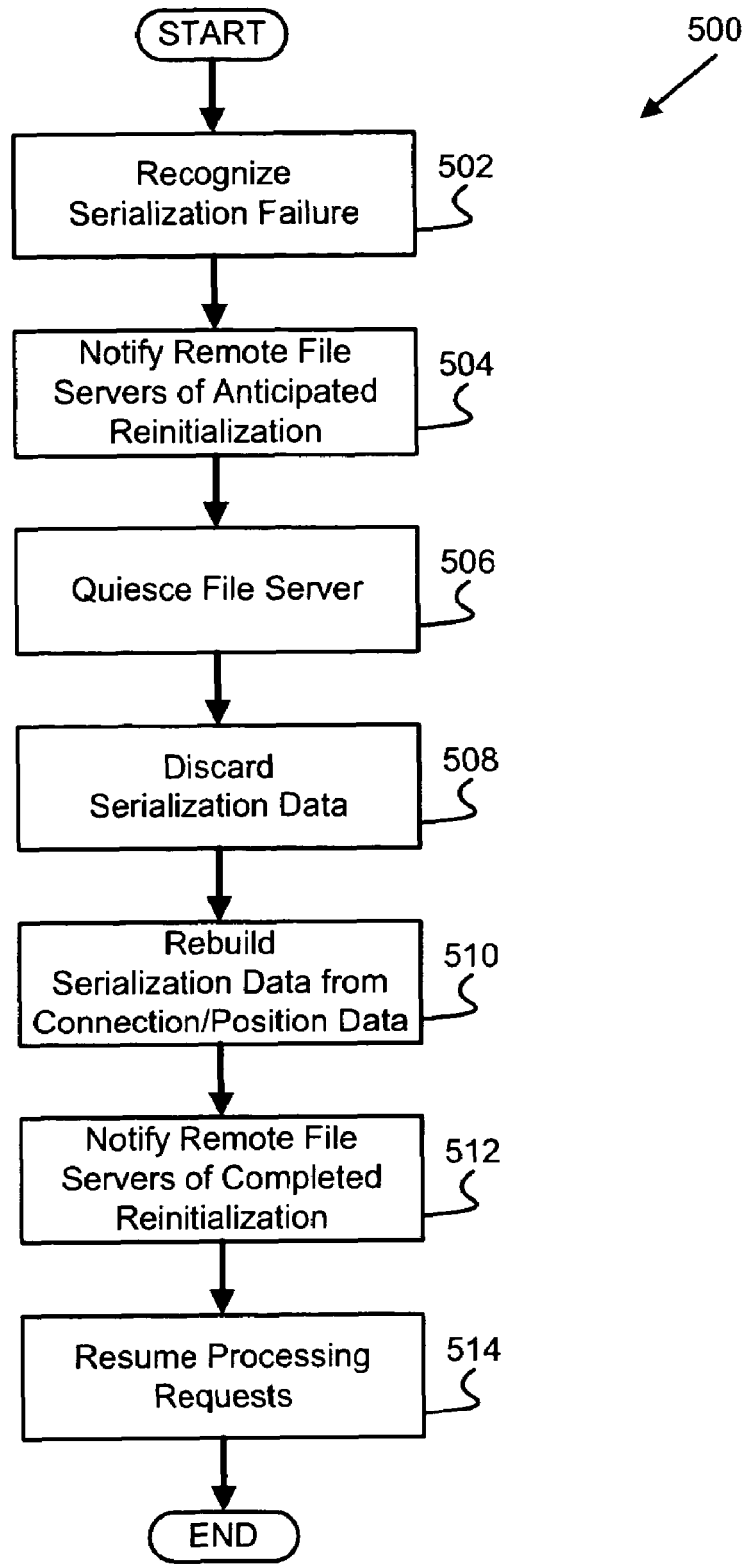
FIG. 5 is a schematic flow chart diagram illustrating one embodiment of a reinitialization method in accordance with the present invention.

FIG. 5 depicts one embodiment of a reinitialization method 500 that maybe performed in conjunction with the serialization reinitialization apparatus 400 described above. The illustrated reinitialization method 500 begins when the failure recognition module 426 recognizes 502 a serialization failure within the file server 102. Although not described in detail herein, the failure recognition module 426 may, in some embodiments, discriminate between different types of serialization failures. Depending on the type of serialization failure detected 502, the serialization reinitialization apparatus 400 may determine not to initiate a serialization reinitialization. However, in the described embodiment, the serialization reinitialization apparatus 400 does initiate a serialization reinitialization.

After a serialization failure is recognized 502, the local serialization reinitialization apparatus 400 notifies 504 each of the remote file servers 102 within the processing cluster 100 that the local file server 102 will be reinitialized to correct the serialization failure. In one embodiment, the back end module 404 may include a notification module (not shown) configured to notify 504 the remote file servers 102 of the anticipated serialization reinitialization. In a further embodiment, the notification module may be included within the failure recognition module 426, the cluster apparatus 430, or another module or apparatus within the serialization reinitialization apparatus 400. In certain embodiments, the notification module may communicate with the coupling facility 106 in order to properly notify 504 the remote file servers 102.

Once all of the remote file servers 102 have been notified 504, the quiesce module 422 initiates 506 a quiesce period prior to the subsequent reinitialization operations. As described above with reference to FIG. 4, new tasks and/or ongoing tasks may be denied or suspended during the quiesce period. One advantage of the quiesce period is to allow the connection/position data 212 to stabilize prior to reinitialization. Otherwise, if the connection/position data 212 are not stable when the serialization reinitialization occurs, the new serialization data 222 may be incorrect. Tasks that are not completed or stabilized during the quiesce period may be terminated, in certain embodiments.

Once the connection/position information 212 is stable and the quiesce period ends, the discard module 424 discards 508 the existing serialization data 222. In one embodiment, the discard module 424 may discard 508 only the existing serialization data 222 and nothing more. In another embodiment, the discard module 424 may discard 508 the completion rights 224, all or part of the back end module 404, as well as the serialization data 222. As described above, the discard module 424 may invoke an operating system function to entirely discard 508 the file server address space 202b.

If the back end module 404 is discarded along with the serialization data, the front end module 402 subsequently may rebuild the back end module 404, including the serialization module 420. The serialization module 420 then rebuilds 510 the serialization data 222 from the connection/position data 212 that remains stable in the front end data 210 during the serialization reinitialization. The new serialization data 222 is expected to be free from serialization conflicts because it is rebuilt from the stable connection/position data 212, rather than from the random arrival of data access requests. In this way, the new serialization data 212 is expected to be robust and not lead to a subsequent serialization failure. Rebuilding 510 the serialization data 222 is described in more detail below with reference to FIG. 6.

With the serialization data 212 rebuilt 510, the file server 102 notifies 512 the remote file servers 102 within the processing cluster 100 that the serialization reinitialization is complete. In one embodiment, the notification module described above may perform this notification operation. The file server 102 may then resume processing data access requests using the new serialization data 222 to manage the serialized access to the shared data storage devices 104. The depicted reinitialization method 500 then ends.

Figure 6:
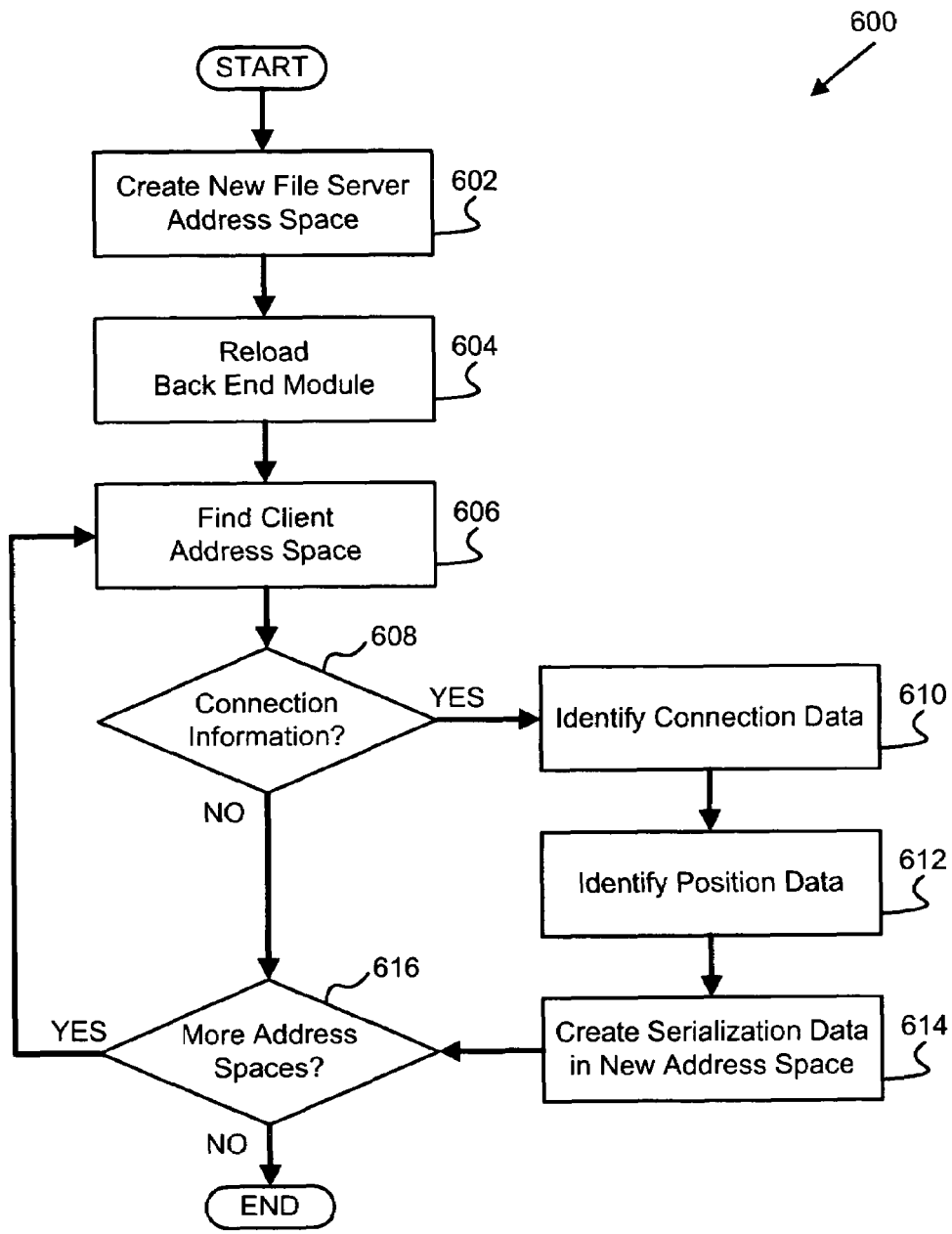
FIG. 6 is a schematic flow chart diagram illustrating one embodiment of a rebuild method in accordance with the present invention.

FIG. 6 depicts one embodiment of a rebuild method 600 that is given by way of example of the serialization rebuild operation 510 of the reinitialization method 500 shown in FIG. 5. The illustrated rebuild method 600 begins when a new file server address space 202a is created 602 in memory 200. This, of course, assumes that the previous file server address space 202b was destroyed, as described above. The back end module 404 is then reloaded 604 into the newly created file server address space 202b. In other words, the serialization module 420, quiesce module 422, discard module 424, and so forth, may be stored in the new file server address space 202b.

The serialization module 420 is then invoked, in one embodiment, to generate the new serialization data 222. In order to do this, the serialization module 420 may search the memory 200 for the client address spaces 202a containing connection/position data 212. In particular, the serialization module 420 finds 606 each address space 202 and determines 608 if a particular address space 202 contains connection/position data 212.

Once the serialization module 420 identifies a client address space 202a, which remains intact during the discard operations 508 described with reference to the reinitialization method 500, the serialization module 420 may begin to rebuild the serialization data 222. Specifically, the serialization module 420 may identify 610 connection data located in the application identifier field 302, directory identifier field 304, and file identifier field 306 (and other similar identifier fields, if applicable). The serialization module 420 also identifies 612 position data located in the position identifier field 308.

The serialization module 420 then uses the identified connection/position information 212 to create 614 the new serialization data 222 in the new file server address space 202b. The serialization module 420 continues to read the connection/position data 212 from the client address spaces 202a and write the new serialization data 222 to the file server address space 202b until the serialization module 420 determines 616 that there is no more connection/position data 212 to be processed. In one embodiment, the serialization module 420 determines 616 that all of the client address spaces 202a have been searched. The depicted rebuild method 600 then ends.

In certain embodiments, the total time required to quiesce 506 the file server 102, discard 508 the existing serialization data 222, and rebuild 510 the new serialization data 222 may be tens of seconds. Advantageously reinitializing the serialization data 222 in this manner does not require the file server 102 to be powered down. Furthermore, the depicted reinitialization method 500 beneficially does not significantly interrupt in-flight application processing, although a data access request possibly may be suspended for a few or more seconds.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to reinitialize a file server, the apparatus comprising:

an electronic memory device of the file server storing serialization programs and data;

a storage device storing executable code;

a processor executing the executable code, the executable code comprising a failure recognition module configured to recognize a file system serialization failure on the file server;

a discard module configured to discard all existing serialization data and completion rights located in a file server address space of the electronic memory device in response to the serialization failure, the serialization data comprising application shared access rights that allow read operations by a first application that interfaces with the file server, and exclusive access rights that allow exclusive write access by the first application for each data set in the file system, and the completion rights comprising a processing status for each application data access request for each data set; and a serialization module configured to read existing connection/position data located in a client address space of the first application, generate new serialization data from the existing connection/position data, and write the new serialization data to the file server address space until the serialization module determines that there is no more connection/position data to process, wherein the connection/position data describes open file connections.

2. The apparatus of claim 1, wherein the electronic memory device comprises the client address space and the file server address space, the client address space stores the connection/position data, the serialization data comprises a task identifier, a resource identifier, and an exclusivity identifier, the connection/position data comprises an application identifier, a directory identifier, a file identifier, and a position identifier and is preserved throughout the generation of the new serialization data by the serialization module and the new serialization data is generated from the application identifier, the directory identifier, and the file identifier with the directory identifier and the file identifier forming the resource identifier.

3. The apparatus of claim 1, further comprising a quiesce module configured to quiesce a current data access process in anticipation of reinitialization.

4. The apparatus of claim 1, the discard module further invoking an operating system function to destroy the file server address space.

5. The apparatus of claim 1, the serialization module further invoking an operating system function to create a new file server address space.

6. The apparatus of claim 5, the serialization module further storing the new serialization data in the new file server address space.

7. The apparatus of claim 1, the serialization module further searching a plurality of address spaces and finding the existing connection/position information in the client address space.

8. The apparatus of claim 1, wherein the connection/position data defines an open connection between an application and a shared storage resource.

9. The apparatus of claim 2, wherein the position identifier defines a current position within the shared storage resource at which the application most recently accessed a shared storage resource.

10. The apparatus of claim 9, wherein the shared storage resource comprises a resource selected from a file, a directory, a sub-directory, and a directory entry.

11. The apparatus of claim 10, wherein the serialization data defines a connection type between the first application and the shared storage resource.

12. The apparatus of claim 11, wherein the connection type defines an exclusivity of an open connection between an application and a shared storage resource.

13. An apparatus to reinitialize a file server, the apparatus comprising:
   an electronic memory device of the file server storing serialization programs and data;
   a storage device storing executable code;
   a processor executing the executable code, the executable code comprising
   a front end module coupled to the electronic memory device, the front end module configured to store connection/position data in a client address space, the connection/position data descriptive of an open connection between an application and a shared storage resource;
   a back end module coupled to the electronic memory device, the back end module configured to manage serialization data located in a file server address space of the electronic memory device for the open connection, the serialization data comprising application shared access rights that allow read operations by a first application through the open connection, the first application interfacing with the file server, and exclusive access rights that allow exclusive write access by the first application through the open connection for each data set in a file system and completion rights, the completion rights comprising a processing status for each application data access request for each data set;
   a failure recognition module recognizing a file system serialization failure on the file server;
   a discard module discarding all existing serialization data and completion rights in response to the serialization failure; and
   a serialization module reading the connection/position data located in the client address space of the first application in response to a file system serialization failure, generating new serialization data from the connection/position data, and writing the new serialization data to the file server address space of the electronic memory device until the serialization module determines that there is no more connection/position data to process, wherein the connection/position data describes open file connections.

14. The apparatus of claim 13, the front end module further operating within the client address space.

15. The apparatus of claim 13, the back end module further operating within the file server address space.

16. The apparatus of claim 13, the serialization module further storing the new serialization data in a new file server address space.

17. The apparatus of claim 13, wherein the serialization data comprises a task identifier, a resource identifier, and an exclusivity identifier, the serialization module further preserves the connection/position data during the generation of the new serialization data, the connection/position data comprises an application identifier, a directory identifier, a file identifier, and a position identifier, and the new serialization data is generated from the application identifier, the directory identifier, and the file identifier with the directory identifier and the file identifier forming the resource identifier.

18. The apparatus of claim 13, further comprising a quiesce module waiting a duration of time for completion of a plurality of ongoing data access processes prior to the generation of new serialization data by the serialization module.

19. The apparatus of claim 13, wherein the shared storage resource comprises a resource selected from a file, a directory, a sub-directory, and a directory entry.

20. A system to reinitialize a file server, the system comprising:
   a plurality of shared storage devices configured to store data;
   a plurality of file servers within a file server cluster, each of the plurality of file servers configured to access data on the shared storage devices; and
   a serialization reinitialization apparatus comprising a code storage device storing executable code and a processor executing the executable code, the executable code when executed reinitializing a first file server of the plurality of file servers in response to a file system serialization failure on the first file server by
   discarding all existing serialization data and completion rights located in a file server address space of the plurality of shared storage devices, the serialization data comprising application shared access rights that allow read operations by a first application that interfaces with the plurality of file servers, and exclusive access rights that allow exclusive write access by the first application for each data set in the file system and including completion rights, the completion rights comprising a processing status for each application data access request for each data set,
   reading existing connection/position data located in a client address space for the first application in the plurality of shared storage devices, generating new serialization data from the existing connection/position data, and writing the new serialization data to the file server address space of the plurality of shared storage devices until the serialization reinitialization apparatus determines that there is no more connection/position data to process, wherein the connection/position data describes open file connections.

21. The system of claim 20, further comprising a notification module allowing the first file server to notify the remaining plurality of file servers in anticipation of reinitialization of the first file server and wherein the client address space comprises the connection/position data, the serialization data comprises a task identifier, a resource identifier, and an exclusivity identifier, the connection/position data comprises an application identifier, a directory identifier, a file identifier, and a position identifier and is preserved throughout the generation of the new serialization data, and the new serialization data is generated from the application identifier, the directory identifier, and the file identifier with the directory identifier and the file identifier forming the resource identifier.

22. The system of claim 21, the notification module further allowing the first file server to notify the remaining plurality of file servers after finalization of reinitialization of the first file server.

23. An electronic storage medium tangibly embodying a program of machine-readable instructions executed by a digital processing apparatus to perform operations to reinitialize a file server, the instructions comprising operations to:
   recognize a file system serialization failure on the file server;
   discard all existing serialization data and completion rights located in a file server address space of the file server in response to the serialization failure,
   the serialization data comprising application shared access rights that allow read operations by a first application interfacing with the file server, and exclusive access rights that allow exclusive write access by the first application for each data set in the file system and the completion rights comprising a processing status for each application data access request for each data set;
   read existing connection/position data located in a client address space for the first application;
   generate new serialization data from the existing connection/position data; and
   write the new serialization data to the file server address space until there is no more connection/position data to process,
   wherein the connection/position data describes open file connections.

24. The electronic storage medium of claim 23, wherein the serialization data comprises a task identifier, a resource identifier, and an exclusivity identifier, the instructions further comprise operations to preserve the connection/position data throughout the generation of the new serialization data by the serialization module, the connection/position data comprises an application identifier, a directory identifier, a file identifier, and a position identifier, and the new serialization data is generated from the application identifier, the directory identifier, and the file identifier with the directory identifier and the file identifier forming the resource identifier.

25. The electronic storage medium of claim 23, wherein the instructions further comprise operations to quiesce a current data access process in anticipation of reinitialization.

26. The electronic storage medium of claim 23, wherein the instructions further comprise operations to invoke an operating system function to destroy the file server address space.

27. The electronic storage medium of claim 23, wherein the instructions further comprise operations to invoke an operating system function to create a new file server address space.

28. The electronic storage medium of claim 27, wherein the instructions further comprise operations to store the new serialization data in the new file server address space.

29. The electronic storage medium of claim 23, wherein the instructions further comprise operations to search a plurality of address spaces and find the existing connection/position data in the client address space.

30. An electronic storage medium tangibly embodying a program of machine-readable instructions executed by a digital processing apparatus to perform operations to reinitialize a file server, the instructions comprising operations to:
   store connection/position data in a client address space of a first application, the connection/position data descriptive of an open connection between an application and a shared storage resource;
   manage serialization data for the open connection, the serialization data comprising application shared access rights that allow read operations by the first application through the open connection, and exclusive access rights that allow exclusive write access by the first application through the open connection for each data set in a file system, the first application interfacing with the file server;
   recognize a file system serialization failure on the file server;
   discard all existing serialization data and completion rights located in a file server address space of the file server in response to the serialization failure, the completion rights comprising a processing status for each application data access request for each data set;
   read the connection/position data located in the client address space in response to the file system serialization failure;
   generate new serialization data from the connection/position data;
   write the new serialization data to the file server address space until there is no more connection/position data to process,
   wherein the connection/position data describes open file connections.

31. The electronic storage medium of claim 30, wherein the instructions further comprise operations to execute a front end module within the client address space.

32. The electronic storage medium of claim 30, wherein the instructions further comprise operations to execute a back end module within a file server address space.

33. The electronic storage medium of claim 30, wherein the instructions further comprise operations to store the new serialization data in a new file server address space.

34. The electronic storage medium of claim 30, wherein the serialization data comprises a task identifier, a resource identifier, and an exclusivity identifier, the existing connection/position data comprises an application identifier, a directory identifier, a file identifier, and a position identifier, the instructions further comprise operations to preserve the connection/position data during the generation of the new serialization data, and the new serialization data is generated from the application identifier, the directory identifier, and the file identifier with the directory identifier and the file identifier forming the resource identifier.

35. The electronic storage medium of claim 30, wherein the instructions further comprise operations to wait a duration of time for completion of a plurality of ongoing data access processes prior to the generation of new serialization data by the serialization module.

36. The electronic storage medium of claim 30, wherein the shared storage resource comprises a resource selected from a file, a directory, a sub-directory, and a directory entry.

37. A method for reinitializing a file server, the method comprising:
   recognizing, by use of a processor, a file system serialization failure on the file server;
   discarding all existing serialization data and completion rights located in a file server address space of the file server in response to the serialization failure, the serialization data comprising application shared access rights that allow read operations by a first application interfacing with the file server, and exclusive access rights that allow exclusive write access by the first application for each data set in the file system and the completion rights comprising a processing status for each application data access request for each data set;

reading existing connection/position data located in a client address space of the first application;

generating new serialization data from the existing connection/position data;

writing the new serialization data to the file server address space until there is no more connection/position data to process, wherein the connection/position data describes open file connections.

38. A method for reinitializing a file server, the method comprising:

recognizing, by use of a processor, a file system serialization failure on the file server;

quiescing a current data access process in anticipation of reinitialization;

discarding all existing serialization data and completion rights located in a file server address space of the file server in response to the serialization failure by invoking an operating system function to destroy the file server address space, the serialization data comprising application access rights that allow read operations by a first application interfacing with the file server, and exclusive access rights that allow exclusive write access by the first application for each data set in the file system and the completion rights comprising a processing status for each application data access request for each data set;

invoking an operating system function to create a new file server address space for the file server;

searching a plurality of address spaces and finding existing connection/position information in the client address space of the first application;

reading the existing connection/position data;

generating new serialization data from the existing connection/position data; and writing the new serialization data to the new file server address space until there is no more connection/position data to process, wherein the connection/position data describes open file connections.

39. An apparatus to reinitialize a file server, the apparatus comprising:

a storage device storing executable code;

a processor executing the executable code, the executable code comprising means for recognizing a file system serialization failure on the file server;

means for discarding all existing serialization data and completion rights located in a file server address space of the file server in response to the serialization failure, the serialization data comprising application shared access rights that allow read operations by a first application interfacing with the file server, and exclusive access rights that allow exclusive write access by the first application for each data set in the file system and the completion rights comprising a processing status for each application data access request for each data set; and means for reading existing connection/position data located in a client address space of the first application, generating new serialization data from the existing connection/position data located, and writing the new serialization data to the file server address space until there is no more connection/position data to process wherein the connection/position data describes open file connections.

40. The method of claim 37, wherein the serialization data comprises a task identifier, a resource identifier, and an exclusivity identifier, the connection/position data comprises an application identifier, a directory identifier, a file identifier, and a position identifier, and the new serialization data is generated from the application identifier, the directory identifier, and the file identifier with the directory identifier and the file identifier forming the new resource identifier.

41. The method of claim 38, wherein the serialization data comprises a task identifier, a resource identifier, and an exclusivity identifier, the connection/position data comprises an application identifier, a directory identifier, a file identifier, and a position identifier, and the new serialization data is generated from the application identifier, the directory identifier, and the file identifier with the directory identifier and the file identifier forming the new resource identifier.

* * * * *

UNITED STATES PATENT AND TRADEMARK OFFICE
CERTIFICATE OF CORRECTION

PATENT NO. : 7,627,578 B2 Page 1 of 1
APPLICATION NO. : 10/932200
DATED : December 1, 2009
INVENTOR(S) : Dearing et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this

Second Day of November, 2010

David J. Kappos
*Director of the United States Patent and Trademark Office*